(12) United States Patent
Gore et al.

(10) Patent No.: US 8,323,041 B2
(45) Date of Patent: Dec. 4, 2012

(54) CONNECTORS FOR CONNECTING A PROJECTOR MODULE TO AN APPLICATION MODULE

(75) Inventors: Brooklin Gore, Boise, ID (US); Johannes J. Dewitt, Boise, ID (US); Steven Howarth, Nampa, ID (US)

(73) Assignee: Citizen Finetech Miyota Co., Ltd., Nagano (JP)

( * ) Notice: Subject to any disclaimer, the term of this patent is extended or adjusted under 35 U.S.C. 154(b) by 0 days.

(21) Appl. No.: 13/029,763

(22) Filed: Feb. 17, 2011

(65) Prior Publication Data

US 2012/0214323 A1 Aug. 23, 2012

(51) Int. Cl.
*H01R 13/44* (2006.01)
(52) U.S. Cl. .................................................... 439/133
(58) Field of Classification Search .................. 439/133, 439/677–681, 638–640, 620.21; 353/119–120, 353/54; 361/679.01, 679.09, 679.55
See application file for complete search history.

(56) References Cited

U.S. PATENT DOCUMENTS

| | | | | |
|---|---|---|---|---|
| 5,041,965 A * | 8/1991 | Chen | ................................. | 345/7 |
| 5,692,821 A * | 12/1997 | Rodriguez et al. | .............. | 353/52 |
| 5,820,242 A * | 10/1998 | Rodriguez et al. | ............ | 353/119 |
| 5,823,651 A * | 10/1998 | Helot et al. | ................... | 353/120 |
| 5,847,748 A * | 12/1998 | Laughlin | ....................... | 725/105 |
| 5,876,105 A * | 3/1999 | Rodriquez, Jr. | ............... | 353/119 |
| 6,799,981 B1 * | 10/2004 | Yu | ................................... | 439/133 |
| 7,172,291 B2 * | 2/2007 | Kitabayashi | .................... | 353/54 |
| 7,452,244 B2 * | 11/2008 | Rohrbach | ..................... | 439/638 |
| 7,485,007 B1 * | 2/2009 | Nee | ................................. | 439/640 |
| 7,530,818 B1 * | 5/2009 | Wang | ............................ | 439/76.1 |
| 7,826,203 B2 * | 11/2010 | McCoy | .................... | 361/679.01 |
| 7,903,397 B2 * | 3/2011 | McCoy | .................... | 361/679.01 |
| 2004/0078268 A1 | 4/2004 | Sprogis | | |
| 2006/0267858 A1 * | 11/2006 | Yun et al. | ....................... | 345/1.1 |
| 2008/0164225 A1 * | 7/2008 | McCoy | ......................... | 211/26.1 |
| 2010/0073581 A1 | 3/2010 | Chien et al. | | |
| 2010/0248546 A1 * | 9/2010 | McCoy | .................... | 439/620.21 |

FOREIGN PATENT DOCUMENTS

| | | |
|---|---|---|
| CN | 1571492 | 1/2005 |
| CN | 201153046 | 11/2008 |
| CN | 201278558 | 7/2009 |

* cited by examiner

*Primary Examiner* — Chandrika Prasad

(57) ABSTRACT

Systems and methods for modular projection that enable a flexible and extendible modular picoprojector system with multiple projector modules and application modules that may be interconnected in a variety of ways for various applications and use models. The systems and methods include connectors and interfaces that enable rapid design of various types of modules for a modular picoprojection system. The systems and methods also include orientation and compatibility features that may be employed in a modular picoprojection system to control connections of various modules with specific features and functions.

16 Claims, 14 Drawing Sheets

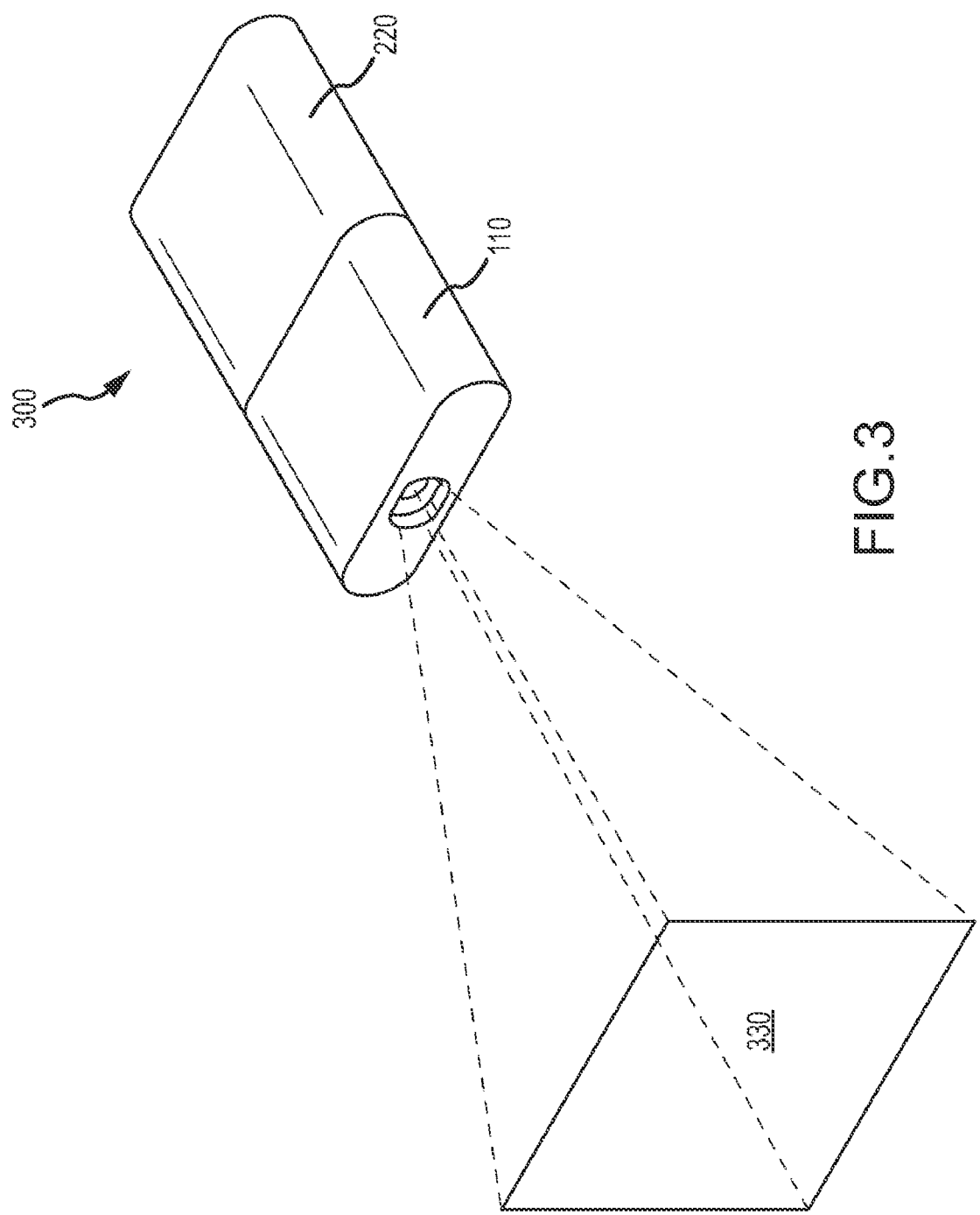

CONNECTORS FOR CONNECTING A PROJECTOR MODULE TO AN APPLICATION MODULE

FIELD OF THE INVENTION

Embodiments of the present invention relate to projection display systems, and specifically to improving portable projection systems.

BACKGROUND

Projection display systems have become increasingly important for conveying and sharing information in modern society. Projection display systems that have become common include cinema projectors, rear projection TVs, and digital projectors for displaying information from computer and consumer video systems. Recently, advances in miniaturization of the components of projection systems have opened up new possibilities in projector system design, allowing smaller projectors known as mini-projectors, pocket-projectors, or picoprojectors. These miniature projection systems typically are developed around an optical projection engine. The optical projection engine is a custom component that generally includes a microdisplay panel, a light source, and optics for projecting the image on an external surface. The microdisplay panel may be manufactured according to one of several commercially viable transmissive or reflective microdisplay panel technologies including, by way of example, Active Matrix Liquid Crystal Display (AM-LCD), Liquid Crystal on Silicon (LCoS), or micro-electromechanical systems (MEMS). Alternatively, the microdisplay may be manufactured using a light emitting technology such as Organic Light Emitting Diodes (OLEDs) or Electroluminescent technologies (EL), in which case the separate light source is not required.

Miniature projectors may display information from a wide variety of sources including desktop computers, laptop computers, netbooks, cell-phones, smart-phones, tablet computers, gaming devices, portable DVD players, digital cameras and camcorders, and/or other portable video systems. Additionally, for particular applications, users of miniature projection systems may desire that the projection system be capable of more advanced features. For example, it may be beneficial if the projection system could store video or still image data for display. It may also be beneficial if the projection system could store documents or other files in standard formats such as PDF, WORD, POWERPOINT, or FLASH. In addition, it may be desired that the user can interact with the miniature projection system through an input device. For these more advanced features, the projection system requires auxiliary system components including non-volatile storage and input devices, and a processing unit to interface with the auxiliary components and generate video from the stored image data, video, documents, or other files.

For each of these applications, a separate miniature projection system must be designed from the component blocks, including the optical projection engine, the processing unit, and the auxiliary system components. The designer must not only integrate the desired functions for the given application, but also must design the processing unit to interface with and control the specific optical projection engine. Even within the same display panel technologies, these optical projection engines may have different data interfaces and control parameters. For example, different optical projection engines may set brightness, contrast, and white point through different means. The wide variety of data interfaces and control parameters complicates the system design for each application.

Additionally, optical projection engine technology is constantly changing. Display device manufacturers, light source manufacturers, and projection optics manufacturers are constantly optimizing the design parameters of the components of the optical projection engines to reduce the size of the engine, increase light output, and reduce power requirements, among other parameters. For each new iteration of an optical projection engine, designers of miniature projection systems must redesign their system boards to accommodate the new optical projection engine design. Accordingly, the amount of system integration required to develop miniature projection systems from the ground up for each application and for each optical projection engine has presented challenges to manufacturers of miniature projection systems seeking to keep pace with the rapid change of business and consumer requirements for these types of projection systems.

BRIEF DESCRIPTION OF THE DRAWINGS

Embodiments of the present invention are illustrated in referenced figures of the drawings. It is intended that the embodiments and figures disclosed herein be considered illustrative rather than limiting.

FIG. 3 shows an example use model of a modular picoprojection system.

DETAILED DESCRIPTION OF EXEMPLARY EMBODIMENTS

Figure 1B:
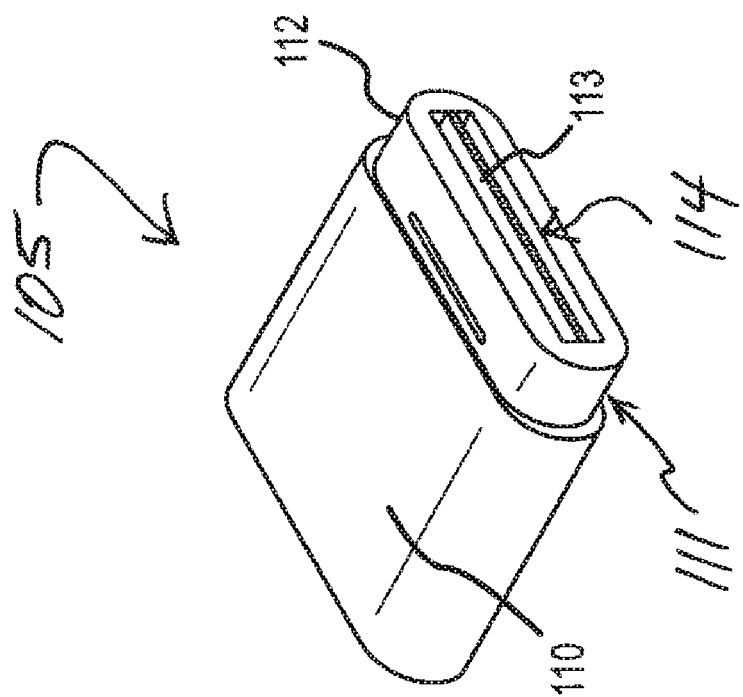
FIG. 1b illustrates an alternate view of a projector module that may be employed in a modular picoprojector system.

Descriptions of embodiments of the present invention are now presented with reference to the accompanying drawings. The descriptions are presented for purposes of illustration only and are not intended to limit embodiments of the present invention to the forms described. Accordingly, variations and modifications commensurate with the following disclosure and skill and knowledge in the relevant art are within the scope of embodiments of the present invention.

Digital projectors are commonly used to display images and video from a variety of sources. Common applications include video projection, business presentations, classroom training, and home theater. These projectors include an optical projection engine, which is made up of a display panel capable of modulating light to create images, projection optics, and commonly a light source. The optical projection engine typically requires specialized drive and control signals, including a video signal having a specific video format and resolution for the display panel, and drive control signals for the display panel and light source. Therefore, digital projectors commonly have auxiliary circuits for format conversion and control of the optical projection engine. Recent technological advances in display panels, light sources, and projection optics have allowed miniaturization of optical projection engines. For example, high-power Light Emitting Diodes (LEDs) have been developed that are much smaller than previous light sources based around an incandescent projector lamp. These LED light sources are also much more efficient than incandescent lamps and offer much lower power consumption for a given light output.

These recent advances have resulted in the ability to create small and highly portable projector systems. For example, it is possible to build a miniaturized projection system that fits in the palm of the hand and is less than an inch thick. These miniaturized projection systems are referred to as microprojectors, nano-projectors, picoprojectors, mobile-projectors, handheld projectors, or pocket-projectors. It will be appreciated that these terms are interchangeable, and while the term picoprojector is used in reference to embodiments of the present invention, this term is not intended to be limiting in nature and the teachings herein are applicable to any projection system, including other miniaturized projection systems. The development of picoprojectors has opened up possibilities of new use models for projection systems. These include using a picoprojector to display video or other documents without the need of an AC power outlet, or a dedicated projection surface. For example, a business presentation could be conducted in almost any location with a flat surface for the projected image, including outdoors and in airplanes or trains. New use models for both business and consumer applications are being developed rapidly that take advantage of the portability of these systems.

Many of these new use models require greater functionality from the picoprojector system. For example, for many new use models, users desire that the picoprojector system be able to store and display video or other content without connecting to an external device. These use models require an internal storage device such as a Flash drive or memory card reader and require a processing unit to read and decode the stored content and generate a video signal for display using the optical projection engine. For example, a picoprojector system could be designed to display business presentations in PDF, WORD, POWERPOINT, or FLASH file formats without connecting to an external device. The picoprojector system may also have input devices to control presentation flow or video playback. However, design of picoprojector systems having advanced capabilities is difficult because of the wide range of potential applications and use models that a user may desire, and the complexity of the optical projection engine requirements.

For example, the picoprojector system described above that is designed to display business presentations may not be capable of displaying video for consumer applications. Video for consumer applications may have different storage requirements and require different graphics processing capabilities. For example, video compressed with various video codecs such as MPEG-2, MPEG-4, Quicktime, or DivX may require specialized processing capabilities to decode. Because the required graphics processing capabilities, input devices, and system components may be different for these different applications, the picoprojector system must be substantially redesigned for each application. Redesigning the picoprojector system includes interfacing new system components with a particular optical projection engine. The difficulty in designing picoprojector systems for new applications limits the ability of manufacturers to meet the rapid pace of change in use models of picoprojector systems.

Embodiments of the present invention include systems and methods for a flexible and extendable modular picoprojector system that allows rapid development of picoprojector systems for emerging applications and use models. The modular picoprojector system includes various modules that may be connected in a variety of configurations for different applications. Various embodiments also include mechanical and electrical interfaces that facilitate module development for modular picoprojector systems. The mechanical interface includes a module input connector and a module output connector that detachably connect together. The electrical interface includes electrical interface ports and a module electrical interface. The electrical interface ports physically connect electrical signals between modules and the module electrical interface includes a set of specifications for electrical signaling used to communicate power and data between modules in the modular picoprojector system. The module electrical interface may include a software interface that defines a set of commands and corresponding module functionality. The mechanical and electrical interfaces may be combined into a projector accessory specification that provides all the specifications for interfacing to any module in the modular picoprojector system. It should be understood that the terms "module input" and "module output" with respect to the connectors and electrical interfaces denote the general direction of signals for the connectors and electrical interfaces, and are not intended to limit the mechanical or electrical properties of the connectors and electrical interfaces. For example, an electrical interface port on a module input connector of a module may have electrical signals that are output signals from the module.

Figure 1A:
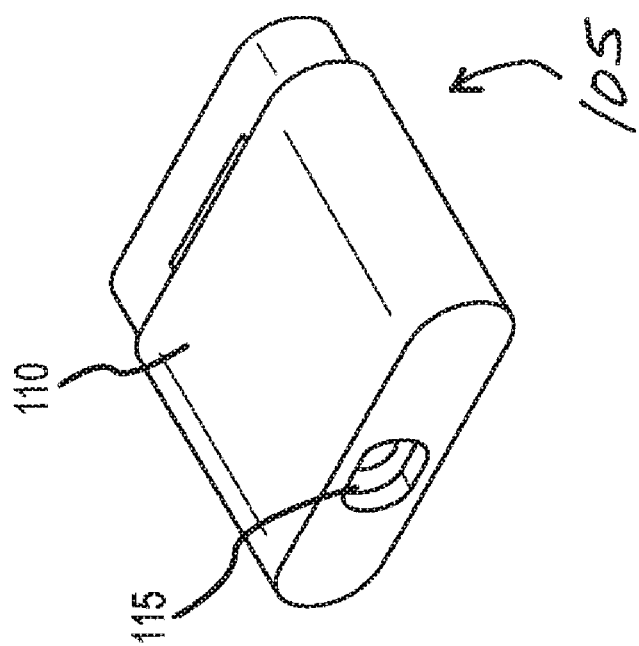
FIG. 1a illustrates a projector module that may be employed in a modular picoprojector system.

FIGS. 1a and 1b illustrate a projector module 105 that could be employed in a modular picoprojector system according to embodiments of the invention. Projector module 105 includes a housing 110 that houses an optical projection engine with projection optics 115 that projects images onto an external surface. Projector module 105 has a module input connector 111 on a side of the housing of the projector module that allows the projector module 105 to be connected to application modules or other modules that have a mating connector. Projector module 105 has an electrical interface port 114 for providing electrical signals through an electrical interface to the projector module 105 that is disposed in the module input connector 111. In this embodiment, the electrical interface port 114 includes an edge connector 113 that has electrical contacts on both sides of the edge connector 113. Preferably, projector module 105 is small and highly portable. For example, in one embodiment the projector module 105 is 0.68 inches thick, 2.5 inches in length, and 2.5 inches in width. In this embodiment, module input connector 111 is 0.5 inches in length.

Figure 2B:
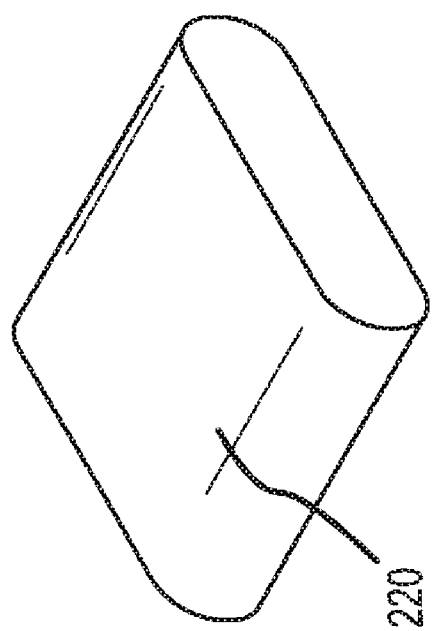
FIG. 2b illustrates an alternate view of an application module that may be employed in a modular picoprojector system.
Figure 2A:
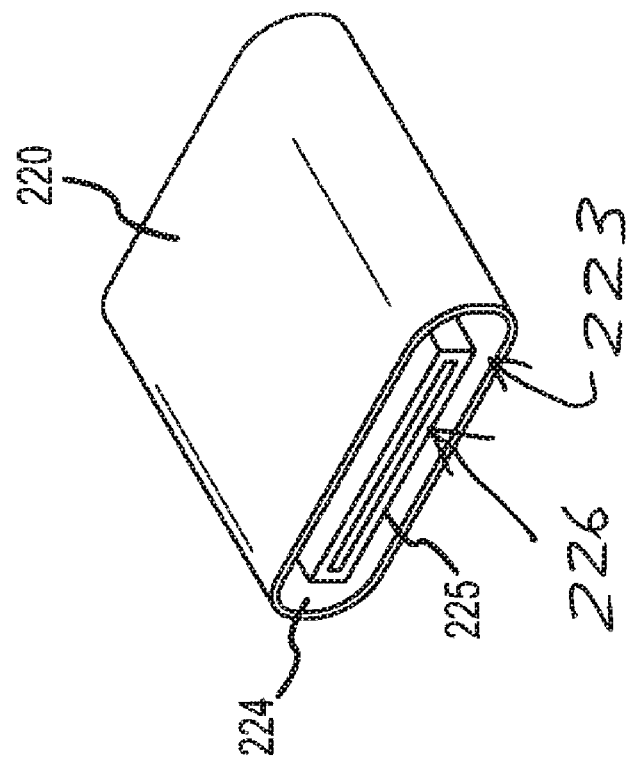
FIG. 2a illustrates an application module that may be employed in a modular picoprojector system.

FIGS. 2a and 2b illustrate an application module 220 for a modular picoprojector system according to embodiments of the invention. Application module 220 has a module output connector 223 that mates to the module input connector 111 of projector module 105. Application module 220 has an electrical interface port 226 that mates to the electrical interface port 114 of the projector module 105. In this embodiment, electrical interface port 226 includes an edge connector socket 225 that has electrical contacts to provide electrical connectivity to the contacts of the edge connector 113 of the electrical interface port 114 of the projector module 105. Application module 220 may have components for storing data and processing graphics information to provide video data to the projector module 105. Components of the application module may include, for example, a graphics processor, non-volatile storage, a display device, a battery, a wireless data interface, and/or input devices.

According to the illustrated embodiments of projector module 105 and application module 220, the module input connector 111 has a plug-type connector body 112 and the module output connector 223 has a socket-type connector body 224 that detachably couples to the plug-type connector body of module input connector 111. For other embodiments, the mechanical configuration of the connectors could be reversed, with the module input connector having a socket-type connector body and module output connector having a plug-type connector body. According to various embodiments, the connector bodies of module input connector 111 and module output connector 223 have an electrically insulating portion around the electrical interface ports 114 and 226.

FIG. 3 illustrates an example of a modular picoprojector system 300 according to embodiments of the invention. Modular picoprojector system 300 includes projector module 110 and application module 220 that are connected together and used to project images onto an external surface 330. Modular picoprojector system 300 may provide images projected onto external surface 330 without connecting to other external devices such as laptop computers or hand-held devices. A variety of use models are possible for embodiments of modular picoprojector system 300. These include, but are not limited to, business presentations, consumer video, video gaming including single-player and multi-player environments, and projection of still images.

Figure 4:
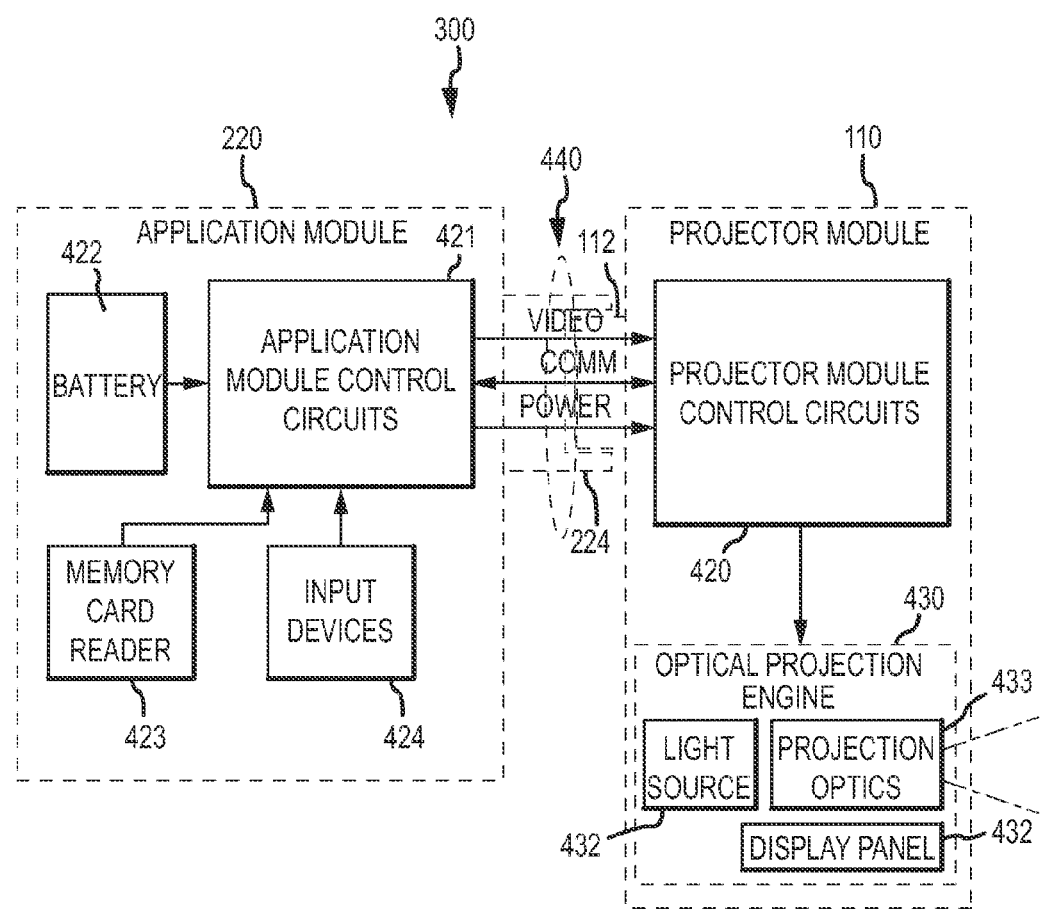
FIG. 4 is a functional block diagram of various components and interconnection of a modular picoprojector system.

FIG. 4 illustrates the various system components and functional interconnections of modular picoprojector system 300 in more detail. Projector module 110 includes projector module control circuits block 420 and optical projection engine 430. Inside optical projection engine 430 is light source 431, display panel 432, and projection optics 433. Application module 220 includes application module control circuits block 421, memory card reader 423, and input devices 424. Application module 220 may be a powered application module by including optional battery 422. Alternately, application module 220 may receive power through a separate power interface cable such as an external DC power supply and a power interface port. Application module 220 may include other components such as other data storage components or a wired or wireless Internet connectivity module. The wired or wireless Internet connectivity module may be, for example, a Wi-Fi interface module or a cellular network interface module. Content may be transferred to application module 220 through the wired or wireless Internet connectivity module or through another wired or wireless interface including, for example, a USB interface or a Bluetooth interface. For example, content could be downloaded via the Internet using wireless Internet connectivity and stored on a memory card inserted in memory card reader 423 for subsequent viewing.

FIG. 4 shows that application module 220 is connected to projector module 110 by connecting module input connector 112 of projector module 110 to module output connector 224 of application module 220. The functionality of application module control circuits block 421 related to displaying content may include a graphics processing unit, system memory, and other circuits required to read data from memory card reader 423, receive power from battery 422, and/or receive user input from input devices 424. Input devices 424 may include, for example, buttons, a trackpad, a click-wheel, a scroll-wheel, a touch-screen display, and/or other input devices that may be used to control functionality of the modular picoprojector system. Application module control circuits block 421 then provides video, power, and control signals to projector module 110 via module electrical interface 440. Projector module control circuits block 420 receives video, power, and control information via the module electrical interface 440 and provides data and other control signals to the various components of optical projection engine 430.

Embodiments of the present invention include the mechanical and electrical specifications for module input connector 112, module output connector 224, electrical interface ports 113 and 225, and module electrical interface 440. These connector and electrical interface specifications facilitate rapid development of various types of modules for new applications and use models and allow for new or upgraded capabilities of application modules, projector modules, and other types of modules without redesigning the entire picoprojector system. In various embodiments, the module input connector 112 may be an extension of the module housing that has a smaller outer dimension. Correspondingly, the module output connector 224 may also be an extension of the module housing that has an inner dimension (defining a void that receives the module input connector 112) that is slightly larger than the outer dimension of the module input connector 112. In this way, the module input connector 112 and module output connector 224 are designed to securely couple the modules together and make the combined modules appear as a single device, as shown in FIG. 3. In addition, the module input connector 112 and module output connector 224 relieve the electrical interface ports from suffering the mechanical stresses of holding the modules together. The module input connector and module output connector may also have retention features that ensure that the modules do not come apart without the user intending to separate the modules.

Module electrical interface 440 used in the modular picoprojector system includes a custom electrical interface according to embodiments of the present invention. The custom electrical interface simplifies design of modules for modular picoprojector systems by reducing the system design requirements. Most standard video interfaces were designed to connect video system components together over long cables, and therefore are not suited to be used to connect modules in a modular projection system. For example, the High-Definition Multimedia Interface (HDMI) is a standard digital video interface designed to carry signals over distances up to 10 meters using transition minimized differential signaling (TMDS). HDMI typically requires specially designed transceiver chips and impedance matched conductors. The transceiver chips consume a large amount of power to generate the high-speed signals used in TMDS. Therefore, HDMI may not be well suited as an interface between modules in a modular picoprojector system, where power and size are more important design parameters.

Module electrical interface 440 includes a video interface for providing video data from one module to another module. In various embodiments, the video interface may include a set of pins that may be used as a 24-bit RGB parallel digital video interface, an 8-bit serial CCIR-601 video interface, an 8-bit serial CCIR-656 video interface, an 8-bit serial RGB video interface, or other suitable interface. This video interface provides a flexible and simple video interface that may be implemented by a wide range of graphics processing units that may be used in an application module without requiring a separate transceiver chip in the application module.

Module electrical interface 440 also includes a communications interface (COMM) according to various embodiments. The communications interface may include a bidirectional communications interface such as a USB interface, an I2C interface, an SPI interface, a Microwire interface, or another suitable communications interface.

Module electrical interface 440 also includes a power interface according to various embodiments. The power interface includes a set of power supply and return pins that may be used to power the projector module. The supply pins may include a 5 volt DC supply and a 12 volt DC supply. In this embodiment the 5 volt supply is used to power logic, control, and other analog or digital components of the projector module. The 12 volt supply may be used to supply a light source in the projector module such as an LED light source. According to various embodiments, module electrical interface 440 provides the only electrical connection between various modules, including between application modules and projector modules. For example, in picoprojector system 300, the only electrical connections between projector module 110 and application module 220 are provided by module electrical interface 440. Table 1 provides a pinout of module electrical interface 440 according to various embodiments.

TABLE 1

| | | | Function | | |
|---|---|---|---|---|---|
| Pin | Name | I/O | 24-Bit RGB Parallel | CCIR-601 CCIR-656 | 8-Bit RGB Serial |
| 1 | DATA0 | I | RGB0 | YCrCb0  YCrCb0 | RGB0 |
| 2 | Vcc | n/a | | 5 VDC | |
| 3 | DATA1 | I | RGB1 | YCrCb1  YCrCb1 | RGB1 |
| 4 | GND | n/a | | Power and Signal Return | |
| 5 | DATA2 | I | RGB2 | YCrCb2  YCrCb2 | RGB2 |
| 6 | CLOCK | I | | CLOCK | |
| 7 | GND | n/a | | Power and Signal Return | |
| 8 | DATA3 | I | RGB3 | YCrCb3  YCrCb3 | RGB3 |
| 9 | VALID | I | VALID | VALID[1]  GND | VALID[1] |
| 10 | DATA4 | I | RGB4 | YCrCb4  YCrCb4 | RGB4 |
| 11 | Vcc | n/a | | 5 VDC | |
| 12 | DATA5 | I | RGB5 | YCrCb5  YCrCb5 | RGB5 |
| 13 | HSYNC | I | HSYNC | HSYNC  GND | HSYNC |
| 14 | GND | n/a | | Power and Signal Return | |
| 15 | DATA6 | I | RGB6 | YCrCb6  YCrCb6 | RGB6 |
| 16 | VSYNC | I | VSYNC | VSYNC  GND | VSYNC |
| 17 | DATA7 | I | RGB7 | YCrCb7  YCrCb7 | RGB7 |
| 18 | Vled | n/a | | 12 VDC | |
| 19 | DATA8 | I | RGB8 | High Z  High Z | High Z |
| 20 | DATA9 | I | RGB9 | High Z  High Z | High Z |
| 21 | GND | n/a | | Power and Signal Return | |
| 22 | DATA10 | I | RGB10 | High Z  High Z | High Z |
| 23 | DATA11 | I | RGB11 | High Z  High Z | High Z |
| 24 | GND | n/a | | Power and Signal Return | |
| 25 | DATA12 | I | RGB12 | High Z  High Z | High Z |
| 26 | DATA13 | I | RGB13 | High Z  High Z | High Z |
| 27 | GND | n/a | | Power and Signal Return | |
| 28 | DATA14 | I | RGB14 | High Z  High Z | High Z |
| 29 | DATA15 | I | RGB15 | High Z  High Z | High Z |
| 30 | GND | n/a | | Power and Signal Return | |
| 31 | DATA16 | I | RGB16 | High Z  High Z | High Z |
| 32 | DATA17 | I | RGB17 | High Z  High Z | High Z |
| 33 | GND | n/a | | Power and Signal Return | |
| 34 | DATA18 | I | RGB18 | High Z  High Z | High Z |
| 35 | DATA19 | I | RGB19 | High Z  High Z | High Z |
| 36 | GND | n/a | | Power and Signal Return | |
| 37 | DATA20 | I | RGB20 | High Z  High Z | High Z |
| 38 | DATA21 | I | RGB21 | High Z  High Z | High Z |
| 39 | GND | n/a | | Power and Signal Return | |
| 40 | DATA22 | I | RGB22 | High Z  High Z | High Z |
| 41 | DATA23 | I | RGB23 | High Z  High Z | High Z |
| 42 | GND | n/a | | Power and Signal Return | |
| 43 | SCK | I | | Serial Interface Clock Input | |
| 44 | SDAT | I | | Serial Interface Data Input | |
| 45 | SDO | O | | Serial Interface Data Output | |
| 46 | SEN | I | | Serial Interface Chip Enable | |
| 47 | GND | n/a | | Power and Signal Return | |
| 48 | SDIO | I/O | | Serial Data Line | |
| 49 | SC2 | I | | Serial Clock 2 | |
| 50 | GND | n/a | | Power and Signal Return | |

[1]Use of VALID not required.
See CCIR 601 or RGB Serial Video Format description for details.

The power interface in module electrical interface 440 according to these embodiments demonstrates a number of advantages of module electrical interface 440 over a standard video interface between an application module and a projection module. Firstly, module electrical interface 440 provides multiple voltage supplies of different voltage levels, for example, a lower voltage supply for logic circuits and a higher voltage supply for a light source. Secondly, using a standard interface might cause consumer confusion and inoperable module arrangements. For example, while power could be supplied using the optional 5 volt power supply pin in a Video Graphics Array (VGA) connector, not all video devices support this optional power supply. Therefore, if a standard VGA connector was used on a projector module to connect to other modules, a consumer would believe that they could plug any device with a VGA video output into the projector module. If the device did not support the power supply pin, the projector module would not be operable and the consumer might be confused and/or frustrated. Therefore, using module electrical interface 440 reduces consumer confusion/frustration and problems of interoperability of modular picoprojector systems with other video devices.

According to various embodiments, module electrical interface 440 may include a software interface. The software interface manages communication between modules and eliminates the need for application modules to have hardware or software components for specific projector modules. Instead, the software interface presents standard function calls that may be used in an application module to control any projector module. For example, Table 2 illustrates several basic module commands that may be implemented using the software interface. Using the software interface, control of projector modules may be integrated into routines and user interfaces of software applications for application modules without additional hardware and software components.

TABLE 2

| Direction | Command |
| --- | --- |
| To Projector | PowerON |
| To Projector | PowerOFF |
| To Projector | ReverseIMAGE |
| To Projector | ReflectIMAGE |
| To Projector | SetWHITEPOINT(x, y) |
| From Projector | getGesture(type) |
| From Projector | getGesturePosition(x, y) |

The benefits of the software interface according to various embodiments may be better understood by considering the illustration of modular picoprojector system 300 in FIG. 4. The software interface allows a software application to control various features and parameters of projector module 110 through the software interface. For example, a software application may be running on a processing unit that is in the application module control circuits block 421 of application module 220. The software application may have a user interface that includes input devices 424. For example, input devices 424 may include a touch-screen display used by the software application to display information and accept input from the user. The software interface allows the software application running on the processing unit to control modular picoprojector system 300 including the functions and features of projector module 110 with the software application user interface. This avoids having separate controls on projector module 110 that will be confusing and redundant to users. For example, using the PowerON and PowerOFF commands of the software interface, the software application running on the processing unit of application module 220 can turn on and off the optical projection engine 430 of projector module 110. In this example, the software interface eliminates the need for a separate power button on projector module 110. The software interface allows the entire modular picoprojector system 300 to be controlled completely through a single user interface on application module 220, thus reducing confusion as a result of separate or redundant user interfaces.

Further, the software interface may be used by projector module 110 to provide user interface capabilities that communicate with a software application running on the processing unit of application module 220. For example, projector module 110 may include a virtual user interface, such as gesture recognition, that would be communicated to the application module via the software interface.

The software interface also standardizes control of projector modules with different optical projection engines. Different optical projection engines typically require hardware specific control signals that depend on the particular display panel and light source in the optical projection engine. The software interface allows an application program running on a processing unit in application module control circuits 421 to interface with different projector modules with the two different optical projection engines seamlessly. For example, to reverse the image horizontally, the display panel in one optical projection engine may require setting a particular register while the display panel of another optical projection engine may require a specific command signal. The software interface allows an application program to control the various functions of different projector modules using the same function calls. For example, the application program may reverse the image horizontally in both projector modules by using the ReverseIMAGE function call. Accordingly, design of various application programs is facilitated by communicating with projector modules through the software interface because the application programs do not need to consider specific requirements of a particular projector module or optical projection engine.

Embodiments of the modular projection system include a flexible system where multiple projector modules having various features and multiple application modules and other modules suited to a variety of applications may be connected in various arrangements to provide an extensive range of functionality for users. For example, a projector module may be connectable to multiple different powered or unpowered application modules. The projector module could be connected in one arrangement with an application module for business presentations and in another arrangement with an application module for consumer video applications. This modular system enables a user to switch between applications without having multiple separate complete picoprojector systems. Embodiments of the modular picoprojector system also contemplate an application module that is connectable to multiple different projector modules. The multiple different projector modules may have different display capabilities or other auxiliary capabilities. For example, an application module could be connected in one arrangement with an SVGA projector module for displaying still image slides and in another arrangement with a WVGA projector module for displaying video.

Figure 5:
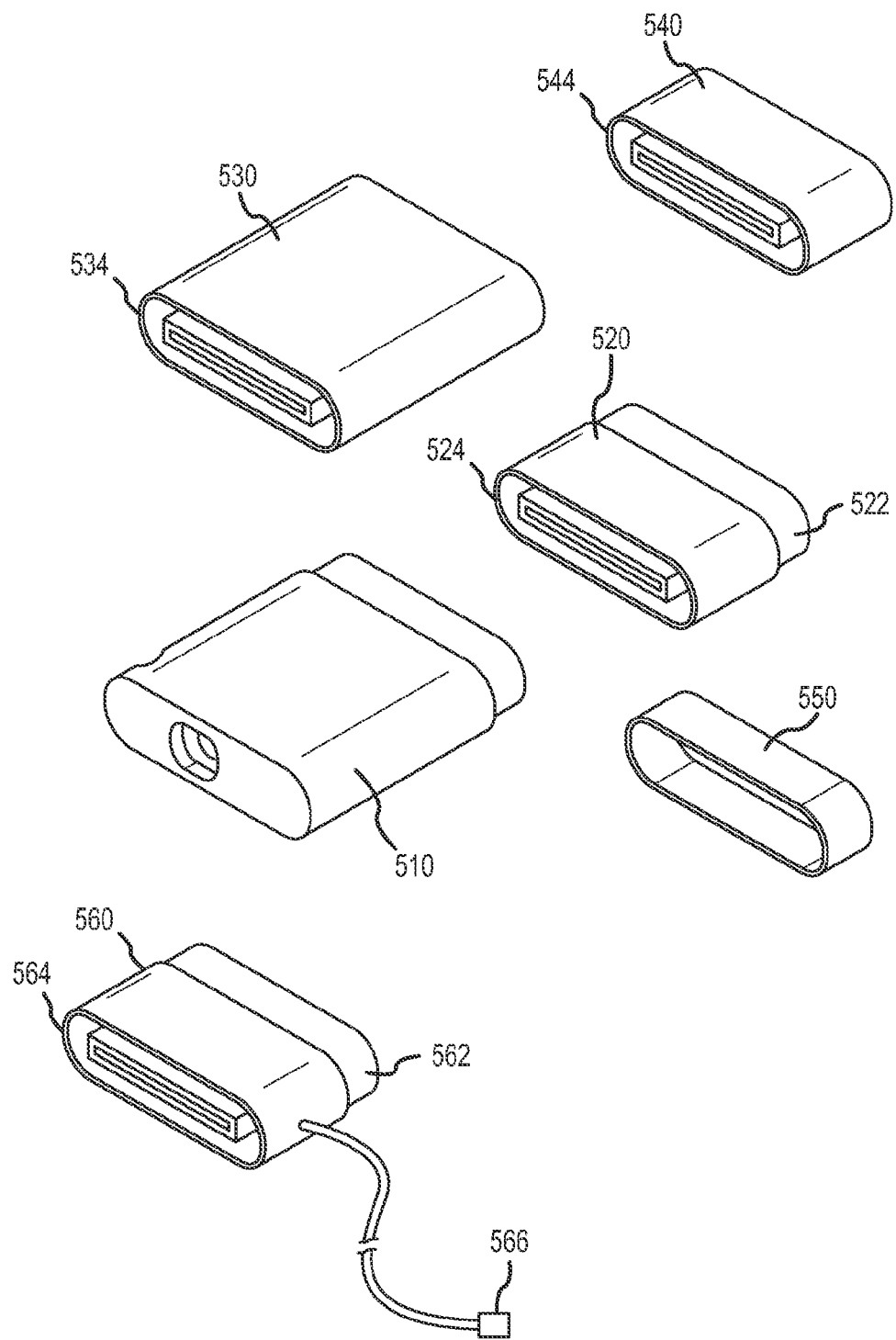
FIG. 5 illustrates various modules that may be employed in a modular projector system.

FIG. 5 illustrates some of the various modules that may be employed in a modular picoprojector system. The illustrated modules include projector module 510, application module 520, powered application module 530, battery module 540, module input connector cover 550, and external interface module 560. As illustrated, application module 520 has a module output connector 524 on one end and a module input connector 522 on an opposite end. Module input connector 522 of application module 520 may be connected to a module output connector of another module. For example, module input connector 522 of application module 520 may be connected to module output connector 544 of battery module 540. Alternately, module input connector 522 of application module 520 may be connected to module output connector 534 of powered application module 530. In this way, certain modules may be stacked with other modules to create system configurations for different applications. Similarly, external interface module 560 as illustrated has a module output connector 564 on one end and a module input connector 562 on an opposite end. Other external interface modules may only have a module output connector. In this case, module input connector 562 allows external interface module 560 to also be stacked with other modules including application modules and power modules. Module input connector cover 550 provides for a more aesthetic system configuration. Other module connector covers could also provide protection for the electrical interfaces.

Figure 6A:
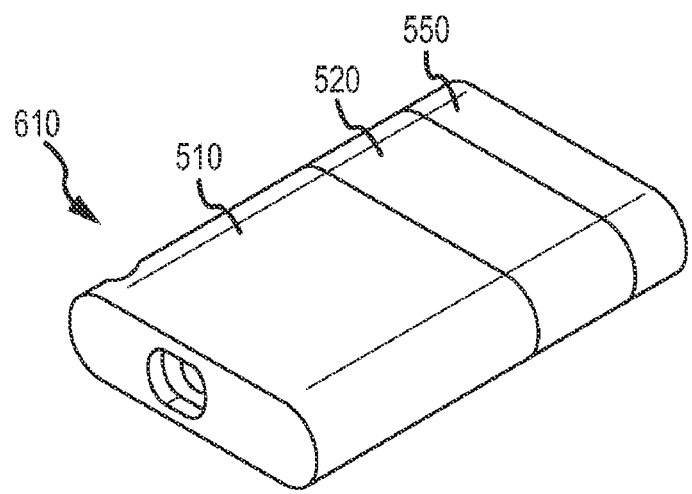
FIG. 6a illustrates an example of a configuration of a modular picoprojector system.

The various modules of a modular picoprojector system according to embodiments of the invention may be connected in many different configurations. For example, FIG. 6a shows picoprojector system configuration 610, which includes projector module 510 connected to application module 520, with module input connector cover 550 over the module input connector 522 of application module 520. Application module 520 provides video data and power through the electrical interface between projector module 510 and application module 520, and power may be supplied to application module 520 by an external cable connected to application module 520. This configuration could be used to display content stored in application module 520 in an environment where external power is available from an AC outlet.

Figure 6B:
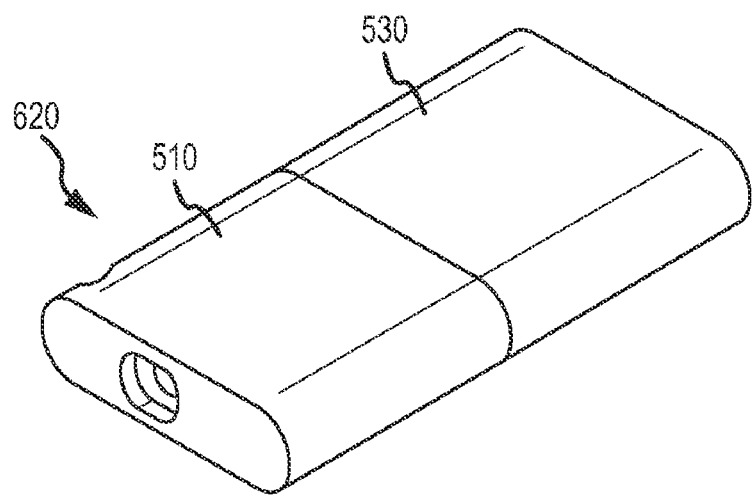
FIG. 6b illustrates another example of a configuration of a modular picoprojector system.

FIG. 6b shows another example picoprojector system configuration 620, which includes projector module 510 connected to powered application module 530. Powered application module 530 supplies video data and power through the electrical interface between projector module 510 and powered application module 530, and an external power supply source and power supply cable are not required. This configuration could be used to display content stored in powered application module 530 in an environment where external power is unavailable. For example, a movie could be projected by picoprojector system configuration 620 onto an external surface without any other external connections.

Figure 6C:
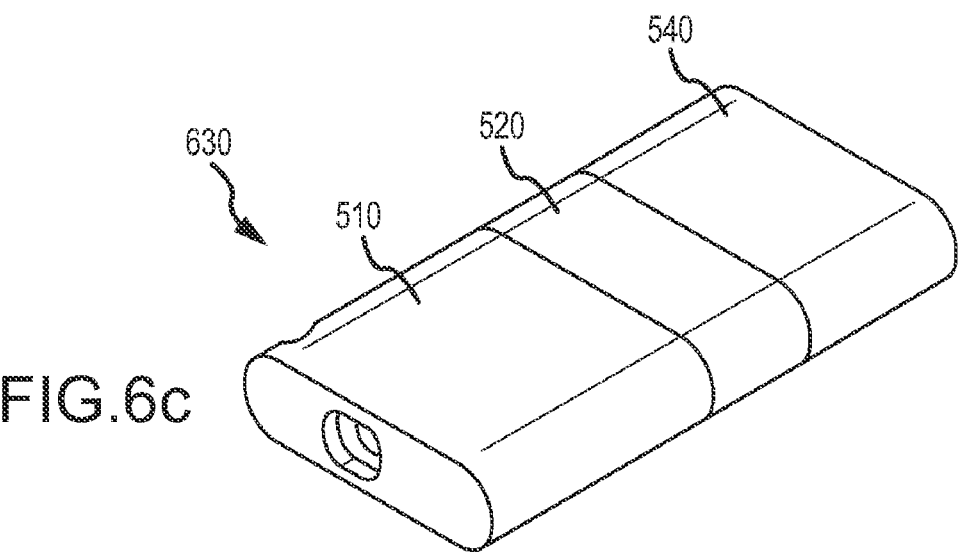
FIG. 6c illustrates another example of a configuration of a modular picoprojector system.

FIG. 6c shows yet another example picoprojector system configuration 630, which includes projector module 510, application module 520, and power module 540. In this configuration, application module 520 supplies video data and power through the electrical interface between projector module 510 and application module 520, and power module 540 supplies power through the electrical interface between power module 540 and application module 520. This configuration could be used to display content stored in application module without any external power or data connections.

Figure 6D:
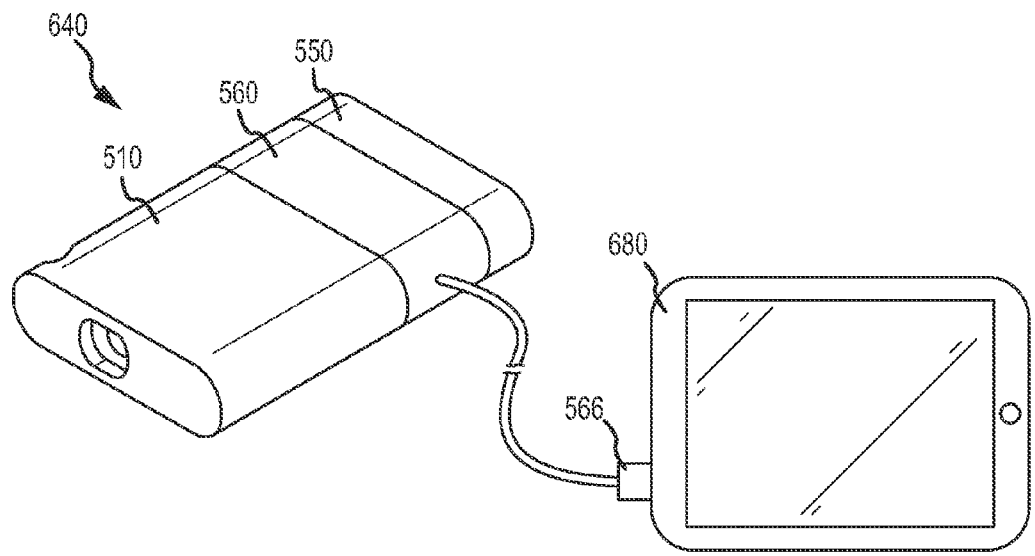
FIG. 6d illustrates another example of a configuration of a modular picoprojector system.

FIG. 6d shows yet another example picoprojection system configuration 640, which includes projector module 510 connected to external interface module 560, with module input connector cover 550 over the module input connector 562 of external interface module 560. In this configuration, external interface module 560 is connected by a cable and external interface connector 566 to external device 680. External interface connector 566 may be a standard video interface connector such as an HDMI connector, an iPhone or iPod dock connector, or any other connector capable of accepting a video output signal from an external device. External interface module 560 receives the video signal from the external device 680 and converts the video signal to the video interface used by the projector module 510. Power may be provided over the cable from the external device 680 to the external interface module 560 and from the external interface module 560 to the projector module.

Figure 6E:
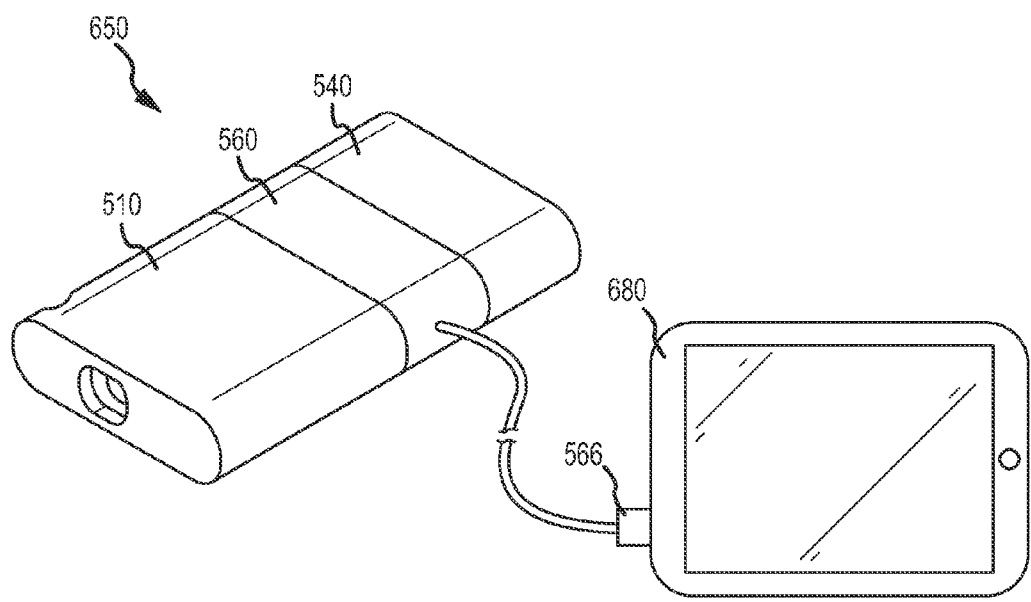
FIG. 6e illustrates another example of a configuration of a modular picoprojector system.

In FIG. 6e, the picoprojector system configuration 640 of FIG. 6d has been modified by connecting power module 540 to the module input connector 562 of external interface module 560 to provide picoprojector system configuration 650. This configuration allows power module 540 to supply power to external interface module 560 and projector module 510. In this configuration, the battery of external device 680 is not loaded by the power requirements of the picoprojector system configuration 550.

Figure 7:
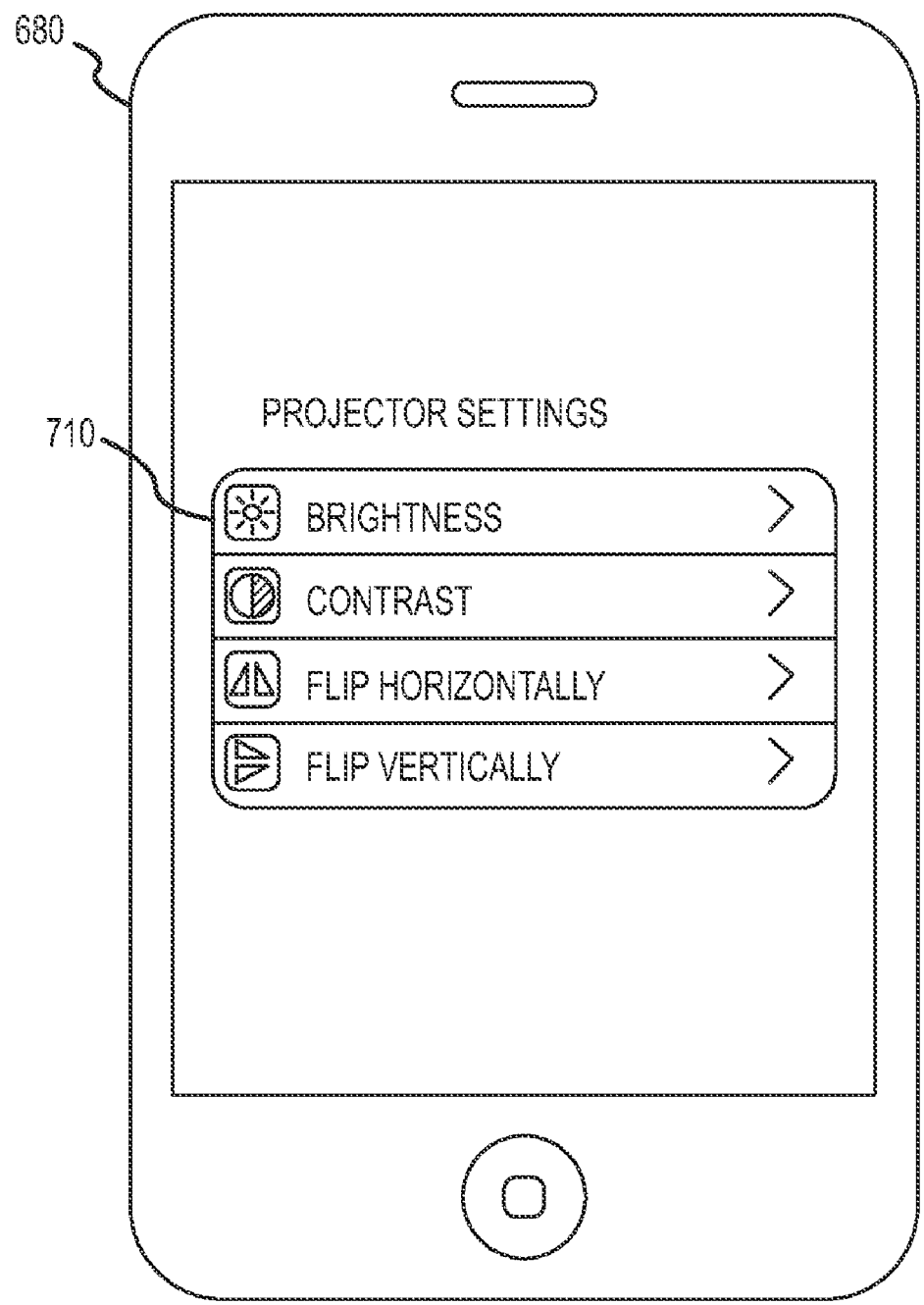
FIG. 7 illustrates control of various parameters of a modular picoprojector system over a software interface using an application program of an external device.

In the picoprojector system configurations 640 and 650, the software interface may be used by the external device 680 to control various functions of the projector module 510. For example, the software interface of module electrical interface 440 may be extended through the external interface module 560 to the external device 680. The external device may integrate control of the projector module 510 and external interface module 680 into its own software application, thus allowing the user to control the content and the picoprojector system functions with the same user interface. For example, FIG. 7 shows Projector Settings menu 710 on external device 680. Using Projector Settings menu 710, the user can control several features of the picoprojector system in configurations 540 and 550. This extended control of the picoprojector system through the external device 680 using the software interface allows for a better user experience of the modular picoprojector system.

A variety of other module arrangements and system configurations are contemplated by the modular picoprojection system according to embodiments of the invention. For example, the projector module 510 could have various other functions or capabilities including a built-in power source such as a battery, a connector to an external power supply, an ambient light sensor, a speaker, a camera, an accelerometer, and/or user input devices including buttons, a touch-screen display, a virtual user interface, and/or a pointing device. In this way, projector modules with different capabilities may be used with different application modules to create useful configurations of the modular picoprojector system for particular applications.

In addition to flexibility of use for different applications, the modular picoprojector system according to various embodiments confers benefits of time to market and cost competitiveness for manufacturers of projector, application, powered application, power, and external interface modules. For example, instead of having to design a complete projection system for a particular application, application module developers can make and sell an application module that will work with a projector module that a consumer already has. The individual modules according to the modular system will also be less expensive than complete picoprojector systems, meaning that a consumer can build multiple picoprojector systems from various modules at a lower cost for each desired application. Additionally, projector module manufacturers can easily upgrade projector modules including a new or improved optical projection engine. Consumers are able to replace only the projector module, and the new projector module will work with various application modules they already have.

Figure 8A:
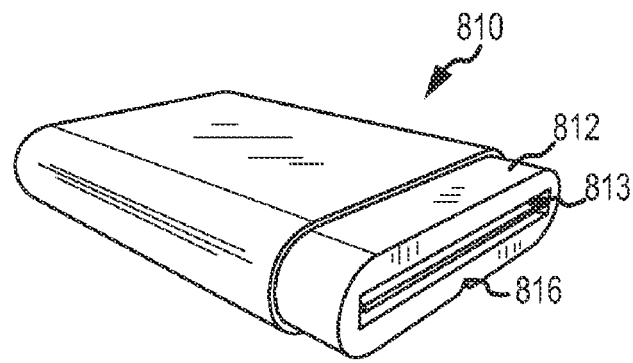
FIG. 8a illustrates a connector with an orientation feature that may be employed in a modular picoprojector system.
Figure 8B:
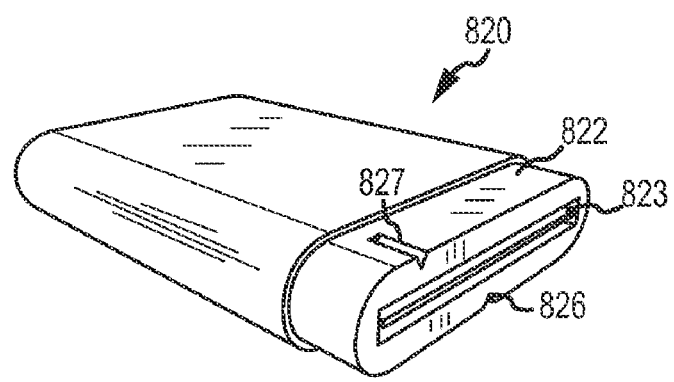
FIG. 8b illustrates a connector with an orientation feature and a first compatibility feature that may be employed in a modular picoprojector system.
Figure 8C:
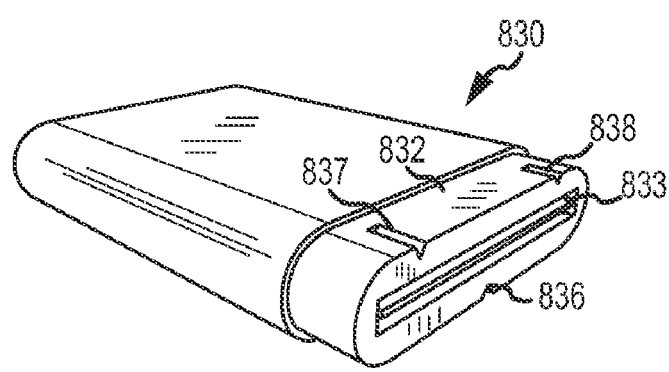
FIG. 8c illustrates a connector with an orientation feature, a first compatibility feature, and a second compatibility feature that may be employed in a modular picoprojector system.

Embodiments of the modular projection systems may include orientation and compatibility features on the connectors of the projector modules and application modules that determine how modules may be connected in a system with multiple projector modules and multiple application modules. FIGS. 8a, 8b, and 8c show projector modules 810, 820, and 830 according to embodiments of a modular picoprojection system. Projector module 810 shown in FIG. 8a has module input connector 812 on one side of the projector module 810. Module input connector 812 includes edge connector 813 to provide electrical contacts for the electrical interface of projector module 810. In this embodiment, module input connector 812 of projector module 812 has an orientation feature 816. Projector module 820 shown in FIG. 8b has module input connector 822. Module input connector 822 has edge connector 823, orientation feature 826, and compatibility feature 827. Projector module 830 shown in FIG. 8c has module input connector 832. Module input connector 832 has edge connector 833, orientation feature 836 and compatibility features 837 and 838.

Figure 9A:
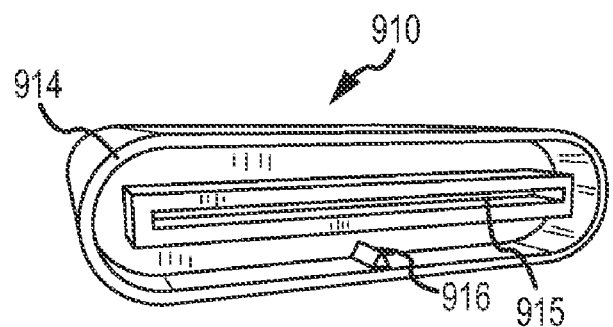
FIG. 9a illustrates a connector with an orientation feature that may be employed in a modular picoprojector system.
Figure 9B:
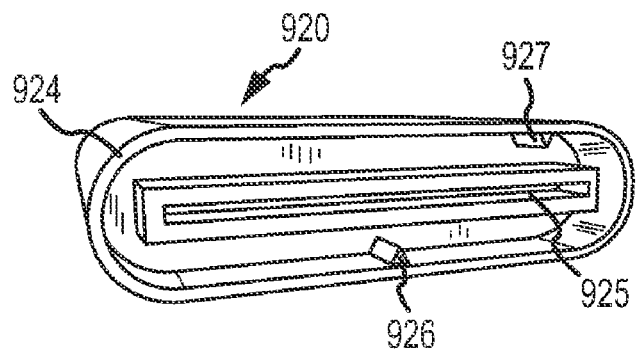
FIG. 9b illustrates a connector with an orientation feature and a first compatibility feature that may be employed in a modular picoprojector system.
Figure 9C:
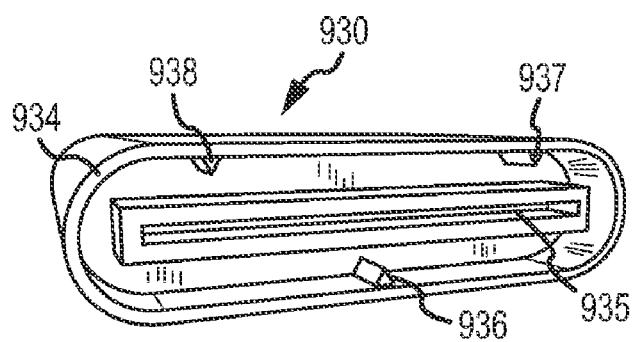
FIG. 9c illustrates a connector with an orientation feature, a first compatibility feature, and a second compatibility feature that may be employed in a modular picoprojector system.

FIGS. 9a, 9b, and 9c show application modules 920, 930, and 940 according to embodiments of a modular picoprojection system. Application module 910 shown in FIG. 9a has module output connector 914 on one side of the application module 910. Module output connector 914 includes edge connector socket 915 to provide electrical contacts for the edge connector 813 of the electrical interface of application module 910. Module output connector 914 has an orientation feature 916 that corresponds to and mates with the orientation feature 816 on the module input connector 812 of the projector module 810. The orientation features 816 and 916 prevent the projector module 810 from being connected to the application module 910 in other than a single orientation.

Application module 920 shown in FIG. 9b has module output connector 924 that includes edge connector socket 925. Module output connector 924 also has orientation feature 926 and compatibility feature 927. The orientation and compatibility features operate to allow application module 920 to be connected to projector module 820 but not to projector module 810.

Application module 930 shown in FIG. 9c has module output connector 934 including edge connector socket 935. Module output connector 934 also has orientation feature 936 and compatibility features 937 and 938. The orientation and compatibility features operate to allow application module 930 to be connected to projector module 830 but not to projector module 820 or projector module 810.

Figure 10:
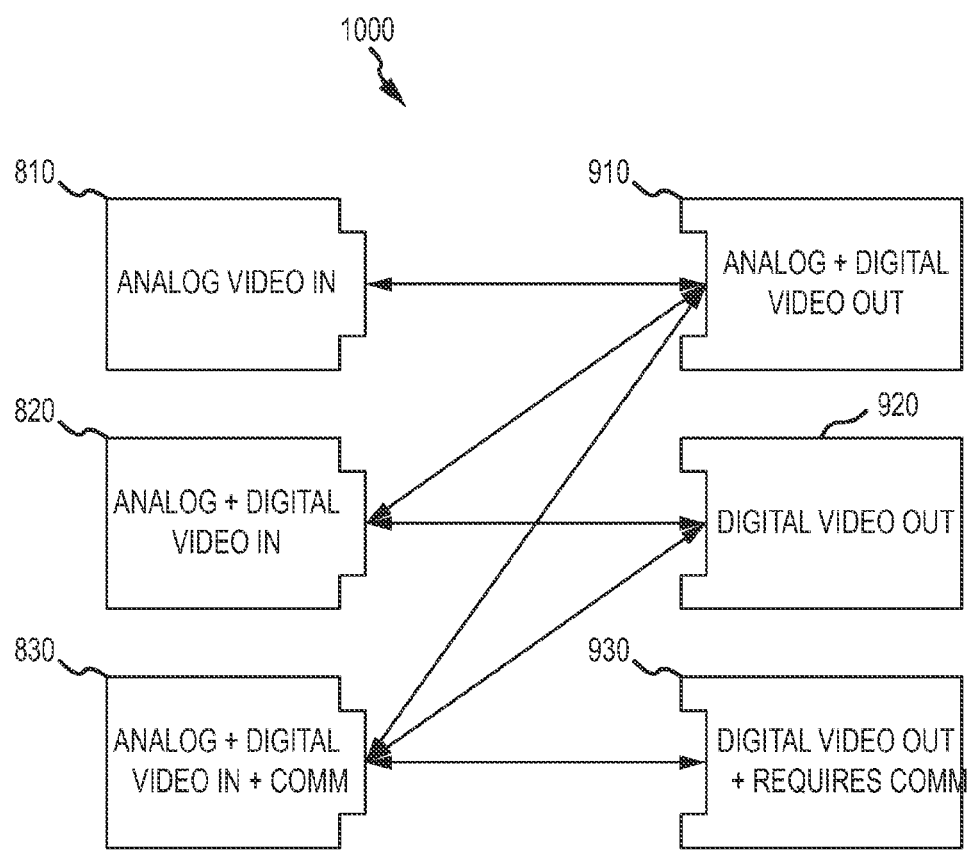
FIG. 10 is a functional diagram of connections between projector modules and application modules in a modular picoprojector system.

FIG. 10 illustrates a diagram of modular connections between application modules and projector modules in a modular picoprojector system 1000 according to embodiments of the present invention. Modular picoprojector system 1000 is designed such that application modules that require a specific interface or functionality from corresponding projector modules may be connected to projector modules that support the specific interface or functionality, but will not be connectable to other projector modules that do not support the specific interface or functionality. In this embodiment, the electrical interface of projector module 810 includes a video interface that only accepts analog video. Projector module 820 has an electrical interface that includes an analog video interface and a digital video interface. Projector module 830 has an electrical interface that includes an analog video interface, a digital video interface, and a communications interface. Application module 910 has an electrical interface that includes an analog video interface and a digital video interface. Application module 920 has an electrical interface that includes a digital video interface but not an analog video interface. Application module 930 has an electrical interface that includes a digital video interface but not an analog video interface, and application module 930 requires a communications interface on corresponding projector modules to support specific functionality required by the application to which application module 930 is directed.

Modular picoprojector system 1000 illustrates functionally how the compatibility features described above in reference to FIGS. 8 and 9 allow connection of compatible modules and prevent connection of incompatible modules. With the module input connectors and module output connectors including the orientation and compatibility features as described in FIGS. 8 and 9, application module 930 is connectable to projector module 830, application module 920 is connectable to projector modules 820 and 830, and application module 910 is connectable to projector modules 810, 820, and 830. Compatibility features 937 and 938 of module output connector 934 prevent application module 930 from connecting to incompatible projector modules 810 and 820 that lack corresponding compatibility features. Additionally, compatibility feature 927 on module output connector 924 prevents application module 920 from connecting to incompatible projector module 810 that lacks a corresponding compatibility feature. Accordingly, the compatibility features ensure that application modules that require specific functions or interfaces of corresponding projector modules in modular picoprojector system 1000 may only be connected to projector modules that support the specific functions or interfaces.

It will be appreciated that the compatibility features as illustrated in FIGS. 8 and 9 are only one example of compatibility features that may be used in a modular picoprojector system according to embodiments of the present invention. The compatibility features illustrated in FIGS. 8 and 9 are tabs on the module output connectors that correspond to slots on the module input connectors. Alternately, the module input connectors may include tabs that require a corresponding slot on module output connectors to allow the modules to be connected together. Additionally, the tabs and slots used on the connectors of a modular picoprojector system according to embodiments of the present invention may be of various numbers, shapes, and lengths on the connectors. For example, the slots and tabs could have a rectangular cross-section instead of a triangular cross-section as shown in FIGS. 8 and 9. The slots and tabs may also be on the inner portion of the module input and module output connectors that surrounds the edge connector and edge connector socket. For example, compatibility tabs could be added to a module input connector that would mate to corresponding slots on a module output connector.

Figure 11:
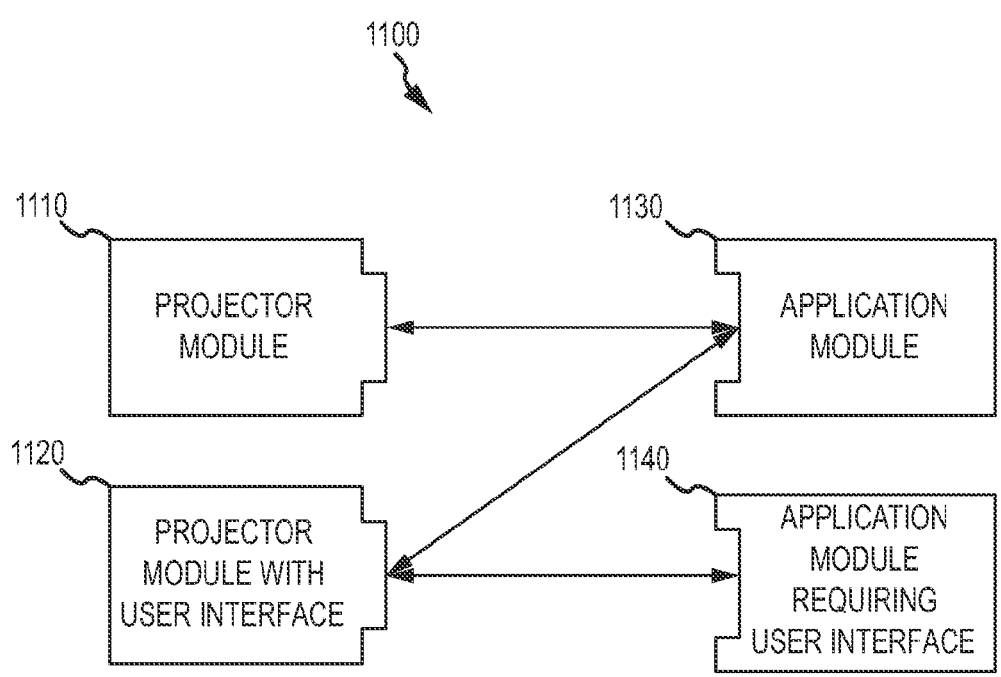
FIG. 11 is a functional diagram of connections between projector modules and application modules in a modular picoprojector system.

FIG. 11 illustrates another example of a modular picoprojection system 1100 according to embodiments of the present invention. Modular picoprojection system 1100 includes projector module 1110 and projector module 1120. Projector module 1120 has an integrated user interface feature, whereby a user can manipulate the projected image or control a pointing device on the projected image and the projector module can communicate the actions of the user over the software interface to an application module. The user interface of projector module 1120 may be a pointing device, a graphical user interface, and/or a virtual user interface. The user interface may include a track-ball, click-wheel, touch-pad, pointing-stick, touch-screen, camera, and/or other input device integrated into the housing of projector module 1120. Alternately the user interface of projector module 1120 may include a wireless pointing device such as a wireless mouse. Modular picoprojector system 1100 also includes application module 1130 and application module 1140. Application module 1140 requires a user interface in a corresponding projector module for the particular application for which it was designed. The compatibility features of FIGS. 8 and 9 may be used in modular picoprojector system 1100 to prevent the connection of incompatible modules. For example, application module 1140 may have a module output connector with compatibility feature 927 as shown on module output connector 924 in FIG. 9b, while the module output connector of application module 1130 does not have compatibility feature 927. Projector module 1120 may have a module input connector with compatibility feature 827 as shown on module input connector 822 of FIG. 8b while the module input connector of projector module 1110 does not have compatibility feature 827. With the compatibility features as described, application module 1140 may be connected to projector 1120 that supports the user interface feature but not to projector module 1110 that does not support the user interface feature. In this way, application modules that require specific features may be only connected to projector modules designed to support those features, which ensures that the modules that can be connected together are interoperable. This modular system reduces consumer confusion because devices that physically connect together are interoperable and it will be clear to the user that devices that do not physically connect together are not interoperable.

It will be appreciated that the compatibility features described above may be used to ensure that projector modules with specific requirements do not connect to application modules without corresponding capabilities. For example, a projector module that requires a certain input current over the power interface of the module electrical interface may have a compatibility feature that prevents application modules that do not have the capability of supply the required power from connecting to the projector module.

Figure 12:
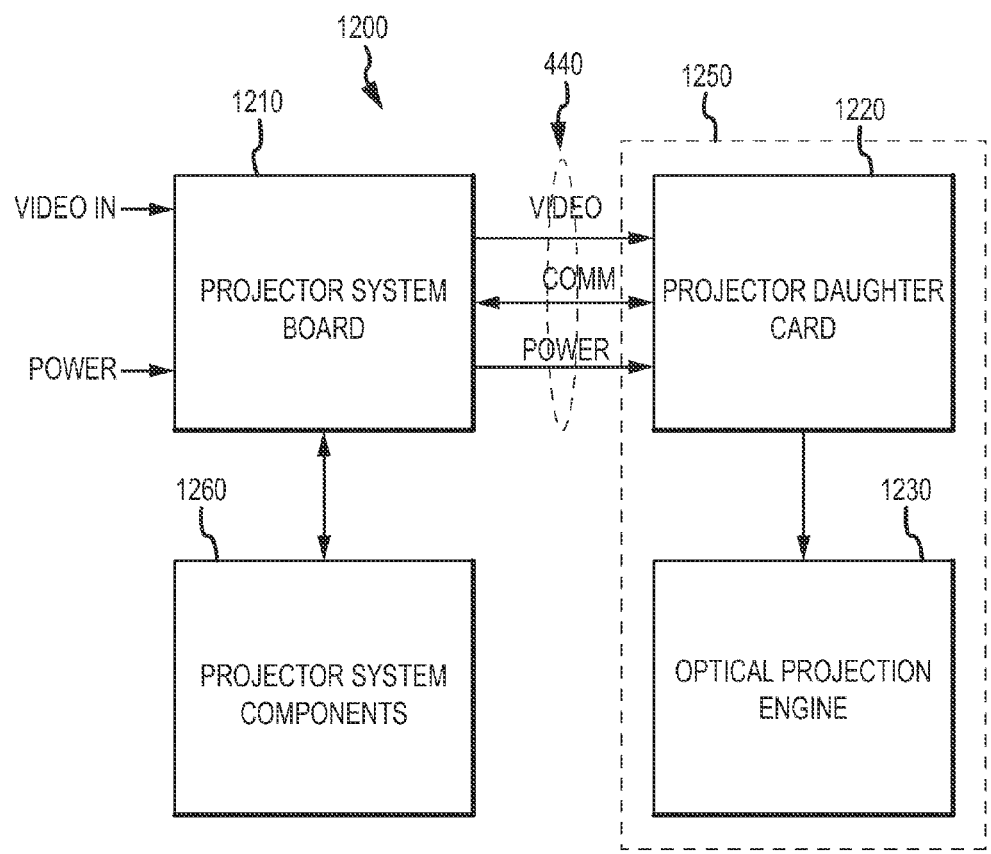
FIG. 12 is a functional block diagram of components of an integrated picoprojector system designed using various components of a modular picoprojector system.

Embodiments of the present invention may be used to design integrated picoprojector systems for particular applications. An integrated picoprojector system may have all the system components required for the particular application integrated into a single housing. FIG. 12 is a functional block diagram that illustrates integrated picoprojector system 1200, according to various embodiments of the present invention. Integrated picoprojector system 1200 includes projector system board 1210, which is connected to various system components 1260. Projector system board 1210 includes a processing unit for reading and processing various video, image, or document files. The various system components, generally illustrated by block 1260, may include storage devices, input devices or user interfaces, and/or interfaces to networks and/ or external devices. For example, storage devices in block 1260 may include an internal hard-drive, solid-state non-volatile memory, and/or memory-card reader used with a removable memory card. Input devices or user interfaces in block 1260 may include a pointing device, a touch-screen, a click-wheel, a scroll-wheel, and/or a virtual user interface. Interfaces to networks and/or external devices in block 1260 may include wired or wireless interfaces such as Wi-Fi, USB, Bluetooth, and/or cellular network interfaces. According to various embodiments, projector system board 1210 is connected to projector engine module 1250 using module electrical interface 440. Projector engine module 1250 includes projector daughter card 1220 and optical projection engine 1230. Projector daughter card 1220 has control circuits that control the various functions and parameters of optical projection engine 1230. Projector daughter card 1220 communicates with projector system board 1210 over module electrical interface 440. Because projector daughter card 1220 contains all circuits that are required to control a specific optical projection engine 1230, projector system board 1210 does not need to be designed specifically for optical projection engine 1230. Additionally, optical projection engine 1230 can be replaced with a newer or different optical projection engine without any changes to projector system board 1210. Therefore, the design of projector system board 1210 is made simpler by not having to have specific functions or circuit components for a specific optical projection engine 1230.

Figure 13:
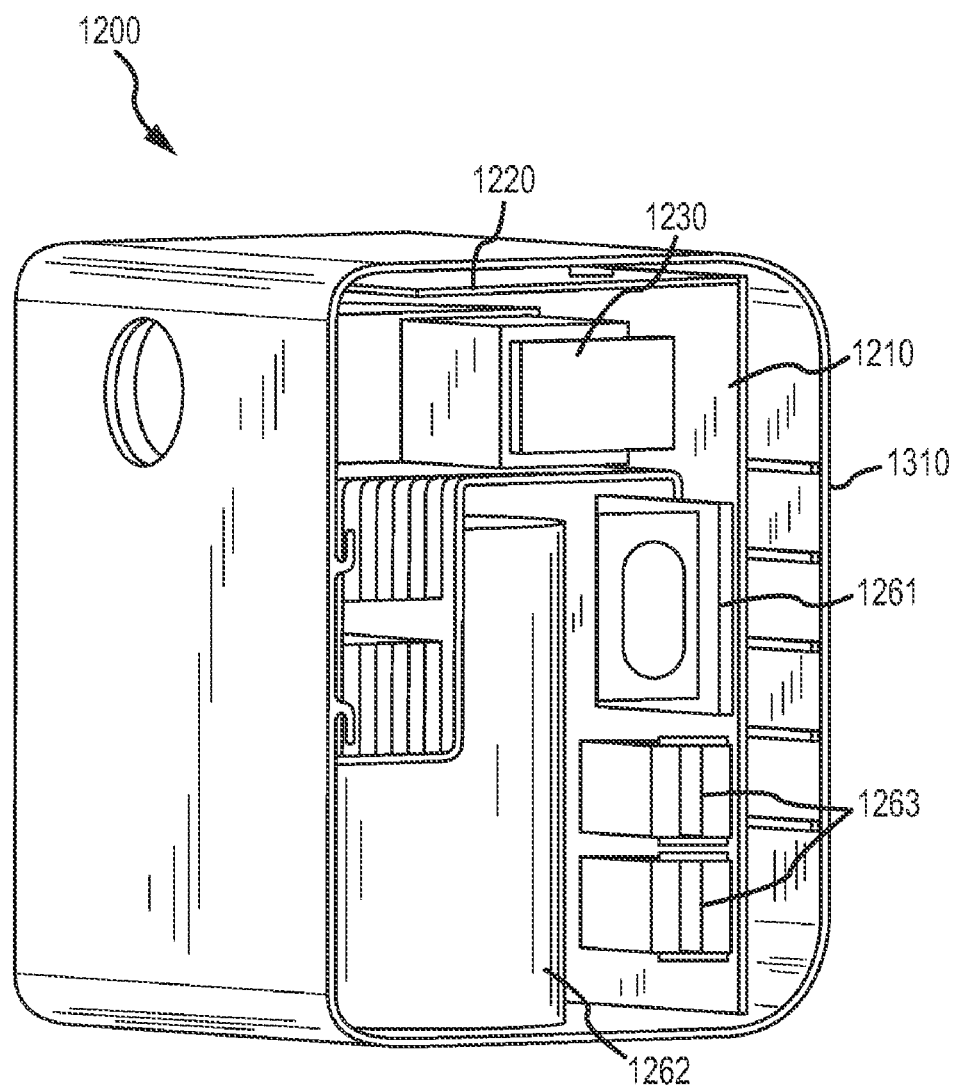
FIG. 13 illustrates an embodiment of an integrated picoprojector system.

FIG. 13 shows an example of an integrated picoprojector system 1200 in housing 1310 according to an embodiment of the invention. As illustrated in the embodiment according to FIG. 13, the various indivdtery 1262, and USB ports 1263. As illustrated in FIG. 12, projector system board 1210 and projector daughter card 1220 are connected by module electrical interface 440. The various other system components of integrated picoprojector system 1200 may include a network interface or other video input interfaces. Integrated picoprojector system 1200 may display image or video data from various sources including the USB ports 1263, network interface, or memory card installed in memory card reader 1261. Rapid design of integrated picoprojector system 1200 for various applications is possible using module electrical interface 440.

The foregoing embodiments and accompanying description have been presented for purposes of illustration. While a number of exemplary aspects and embodiments have been discussed above, the description is not intended to limit embodiments of the present invention to the form disclosed herein. Those of skill in the art will recognize variations, modications, additions, and sub-combinations thereof.

What is claimed is:

1. A picoprojector module for a modular picoprojector system that detachably connects to a connector of an application module, the projector module comprising:
    a picoprojector module housing;
    a display device disposed in the picoprojector module housing that is operable to project an image on an external surface; and
    a connector disposed on the picoprojector module housing, the connector including a connector body and an electrical interface disposed in the connector body, the connector body including an electrically insulating portion around the electrical interface,
    wherein the connector body of the projector module connector detachably connects to a connector body of the connector of the application module and the electrical interface of the projector module connector mates to an electrical interface of the application module connector,
    and wherein the electrical interface of the projector module connector comprises a video interface and a communication interface for transferring module control information.

2. The picoprojector module of claim 1, wherein the communication interface is a bidirectional communication interface.

3. The picoprojector module of claim 1, wherein one of the connector body of the projector module connector and the connector body of the application module connector is a plug-type connector body, and the other of the connector body of the projector module connector and the connector body of the application module connector is a socket-type connector body.

4. The picoprojector module of claim 3, wherein the connector body of the projector module connector is the plug-type connector body and the connector body of the application module connector is the socket-type connector body.

5. The picoprojector module of claim 1, wherein one of the electrical interface of the projector module connector and the electrical interface of the projector module connector comprises an edge connector that connects to an edge connector socket of the other of the one of the electrical interface of the projector module connector and the electrical interface of the application module connector.

6. The picoprojector module of claim 5, wherein the electrical interface of the projector module connector comprises an edge connector and the electrical interface of the application module connector comprises an edge connector socket.

7. A modular picoprojector system, comprising: a projector module;
    an application module that is connectable to the projector module; and
    an electrical interface between the projector module and the application module that includes a set of electrical contacts in a single electrical interface port, the set of electrical contacts including a first plurality of contacts associated with a video interface, a second plurality of contacts associated with a communication interface for transferring module control information, and a third plurality of contacts associated with a power interface.

8. The system of claim 7, wherein the video interface is an analog video interface.

9. The system of claim 7, wherein the video interface is a digital video interface.

10. The system of claim 7, wherein the communications interface is a bidirectional serial interface.

11. The modular picoprojector system of claim 7, wherein the projector module projects an image onto a surface that is distinct from the projector module.

12. A modular picoprojector system, comprising:
a projector module;
an application module having a module connector for connecting to one of a plurality of projector module connectors, the plurality of projector module connectors having a plurality of connector bodies and a plurality of electrical interfaces disposed in the plurality of connector bodies, the plurality of electrical interfaces including a first type of electrical interface and a second type of electrical interface that is different from and incompatible with the first type of electrical interface, the module connector comprising:
a connector body that detachably couples to the plurality of projector module connector bodies; and
an electrical interface disposed in the connector body, the electrical interface being of the first type of electrical interface,
wherein the connector body has a mechanical compatibility feature that prevents the module connector from connecting to a projector module connector with the second type of electrical interface.

13. The modular picoprojector system of claim 12, further including an orientation feature that prevents the module connector from connecting to the plurality of projector module connectors in more than one orientation.

14. The modular picoprojector system of claim 12, wherein the connector body of the module connector is a socket-type connector body and the projector module connector body is a plug-type connector body, and wherein the mechanical compatibility feature is a tab on the connector body of the module connector.

15. A modular picoprojector system according to claim 12, wherein the module connector includes an electrical interface that includes a digital video interface, the connector body of the application module having a compatibility feature that prevents a projector module without an electrical interface including a digital video interface from connecting to the application module.

16. An application module for connecting to one or more other modules in a modular projector system, comprising:
a housing having a first side and a second side that is opposite from the first side;
a first connector on the first side of the housing, the first connector having a connector body of a first type that detachably couples to a connector on one of the one or more other modules in the system, the connector on the one other module having a connector body of a second type, the connector body of the first connector having a first electrical interface disposed in the connector body;
a second connector on the second side of the housing, the second connector having a connector body of the second type, the connector body of the second connector having a second electrical interface disposed in the connector body; and
a graphics processing unit in the housing, the graphics processing unit operable to receive graphics information in a first format and provide graphics information in a second format.

* * * * *